(12) United States Patent
Willette et al.

(10) Patent No.: US 12,265,005 B2
(45) Date of Patent: Apr. 1, 2025

(54) ENVIRONMENTAL DNA SAMPLE COLLECTOR

(71) Applicant: Loyola Marymount University, Los Angeles, CA (US)

(72) Inventors: Demian Willette, Los Angeles, CA (US); Emily Hawkins, Los Angeles, CA (US); Joshua Simkin, Los Angeles, CA (US)

(73) Assignee: Loyola Marymount University, Los Angeles, CA (US)

( * ) Notice: Subject to any disclaimer, the term of this patent is extended or adjusted under 35 U.S.C. 154(b) by 164 days.

(21) Appl. No.: 18/208,865

(22) Filed: Jun. 12, 2023

(65) Prior Publication Data

US 2023/0400393 A1 Dec. 14, 2023

Related U.S. Application Data

(60) Provisional application No. 63/351,284, filed on Jun. 10, 2022.

(51) Int. Cl.
*G01N 1/40* (2006.01)

(52) U.S. Cl.
CPC ... *G01N 1/4005* (2013.01); *G01N 2001/4016* (2013.01)

(58) Field of Classification Search
CPC ......... G01N 1/4005; G01N 2001/4016; G01N 2001/2285; G01N 1/2202; G01N 1/2205; G01N 1/2273; G01N 1/10
See application file for complete search history.

(56) References Cited

U.S. PATENT DOCUMENTS

| | | | |
|---|---|---|---|
| 9,790,535 B2 | 10/2017 | Huang et al. | |
| 2003/0113937 A1* | 6/2003 | Kipke | G01N 1/40 436/175 |
| 2020/0246755 A1* | 8/2020 | Thomas | B01D 69/1213 |

FOREIGN PATENT DOCUMENTS

WO WO-2022040749 A1 * 3/2022

OTHER PUBLICATIONS

Bessey, et al., "Passive eDNA collection enhances aquatic biodiversity analysis", Communications Biology, 4:236, 2021, 12 pages, https://doi.org/10.1038/s42003-021-01760-8.
Maiello, et al., "Little samplers, big fleet:eDNA metabarcoding from commercial trawlers enhances ocean monitoring", Fisheries Research, 249:106259, 2022, 3 pages.
Verdier, et al., "Passive sampling of envirinmental DNA in aquatic environments using 3D-printed hydroxyapatite samplers", bioRxiv, https://doi.org/10.1101/2021.05.12.443744, 2021, 26 pages.

* cited by examiner

*Primary Examiner* — Jennifer Wecker
*Assistant Examiner* — Jonathan Bortoli
(74) *Attorney, Agent, or Firm* — LOZA & LOZA, LLP; Michael Fedrick

(57) ABSTRACT

An eDNA sample collection device having a rigid housing with openings to allow contact between the interior of the housing and the external environment. The housing includes membrane retaining portions for holding flexible membranes in the housing of the device, and membrane holders are used to secure membranes within the housing.

17 Claims, 19 Drawing Sheets

ENVIRONMENTAL DNA SAMPLE COLLECTOR

CROSS-REFERENCE TO RELATED APPLICATIONS

This application claims the benefit of priority under 35 U.S.C. § 119(e) from U.S. Patent Application No. 63/351,284, filed Jun. 10, 2022 and entitled ENVIRONMENTAL DNA SAMPLE MEMBRANE COLLECTOR, the disclosure of which is incorporated herein by reference in its entirety.

INTRODUCTION/BACKGROUND

Environmental DNA (eDNA) is organismal DNA that can be found in the environment. Environmental DNA is derived from cells, either from single-celled organisms or from material shed by organisms (such as necrotic tissue, skin, hair, and waste) into aquatic or terrestrial environments that can be sampled and monitored. Monitoring environmental DNA can yield information about species distribution and the relative abundance of species in an environment.

Devices for capturing eDNA from an aquatic environment typically use filters. However, eDNA may have a relatively small size, such as from 0.2 µm to 10 µm, so filters for capturing eDNA generally require a pore size small enough to capture such molecules. As a result, these filters can easily become clogged. Alternatively, eDNA can be passively collected onto membranes. Once collected, eDNA particles are extracted, amplified by PCR, sequenced, and then compared to a reference database of known DNA sequences in order to determine the identities of species in a sample. Such membranes, however, are subject to stresses such as fluid flows and other pressures when placed in environments such as open bodies of water, which may also soften such membranes and make them more easily damaged. There remains a need therefore for devices for collecting eDNA which can support and protect DNA-collecting membranes while also allowing the membranes to contact the environment.

SUMMARY

The sample collectors of the present invention provide an improved way to passively collect eDNA with membranes, which advantageously are relatively inexpensive and optimized for later laboratory processing to extract an analyze the eDNA using commercially available DNA extraction kits.

The present environmental DNA sample collector includes a rigid housing, a receptacle for a collection membrane in the housing, a reversibly securable membrane holder which retains the membrane within the membrane receptacle, and a membrane for capturing environmental DNA which comes in contact with the membrane from a fluid environment in which the sample collector is positioned. The housing has an upper end, a lower end, a first face, a second face, an interior, and an exterior, where the first face and the second face each have a right side, a left side, and at least one opening between the interior and the exterior of the housing. The membrane receptacle is in fluid communication with opening in the housing.

The housing can be pyramidal, spherical, cubical, or can be other shapes. If the housing is pyramidal, the first face, second face, and third face are each are triangular in shape, with the right side of the first face being attached to the left side of the second face, the right side of the second face being attached to the left side of the third face, and the right side of the third face being attached to the left side of the first face. The base of the pyramidal housing is also triangular in shape and comprises a fourth face of the housing whose sides are attached to the bottom sides of the first face, the second face, and the third face, respectively. In this embodiment, the sample collector can include three membrane receptacles, where the first face, the second face, and the third face of the housing each have at least one opening between the interior and the exterior of the housing and have a membrane receptacle in fluid communication with the opening.

The housing can alternatively be spherical in shape and have an upper half and a lower half, where the upper half is reversibly securable to the lower half in order to allow access to the interior of the housing. The interior of the housing includes one or more membrane receptacles, each of which preferably comprises a pair of approximately parallel slots positioned on an interior surface of the interior of the housing, each slot having a groove extending from an upper end of the slot to a lower end and having an opening at the upper end. In this embodiment, the membrane holder can be a flexible, planar panel having a pair of approximately parallel sides, where each parallel side of the panel is adapted to be placed through the opening of a corresponding slot and to be placed in the groove of the corresponding slot. The planar panel can have a plurality of openings as well.

In another embodiment, the housing holds only one membrane receptacle. In this case, the membrane receptacle can comprise a pair of parallel slots, with each slot having a groove extending from an upper end of the slot to a lower end and having an opening at the lower end. The membrane holder can be a planar panel having a pair of approximately parallel sides, where each parallel side of the panel is adapted to be placed through the opening of a corresponding slot and to be placed in the groove of the corresponding slot.

Figure 1:
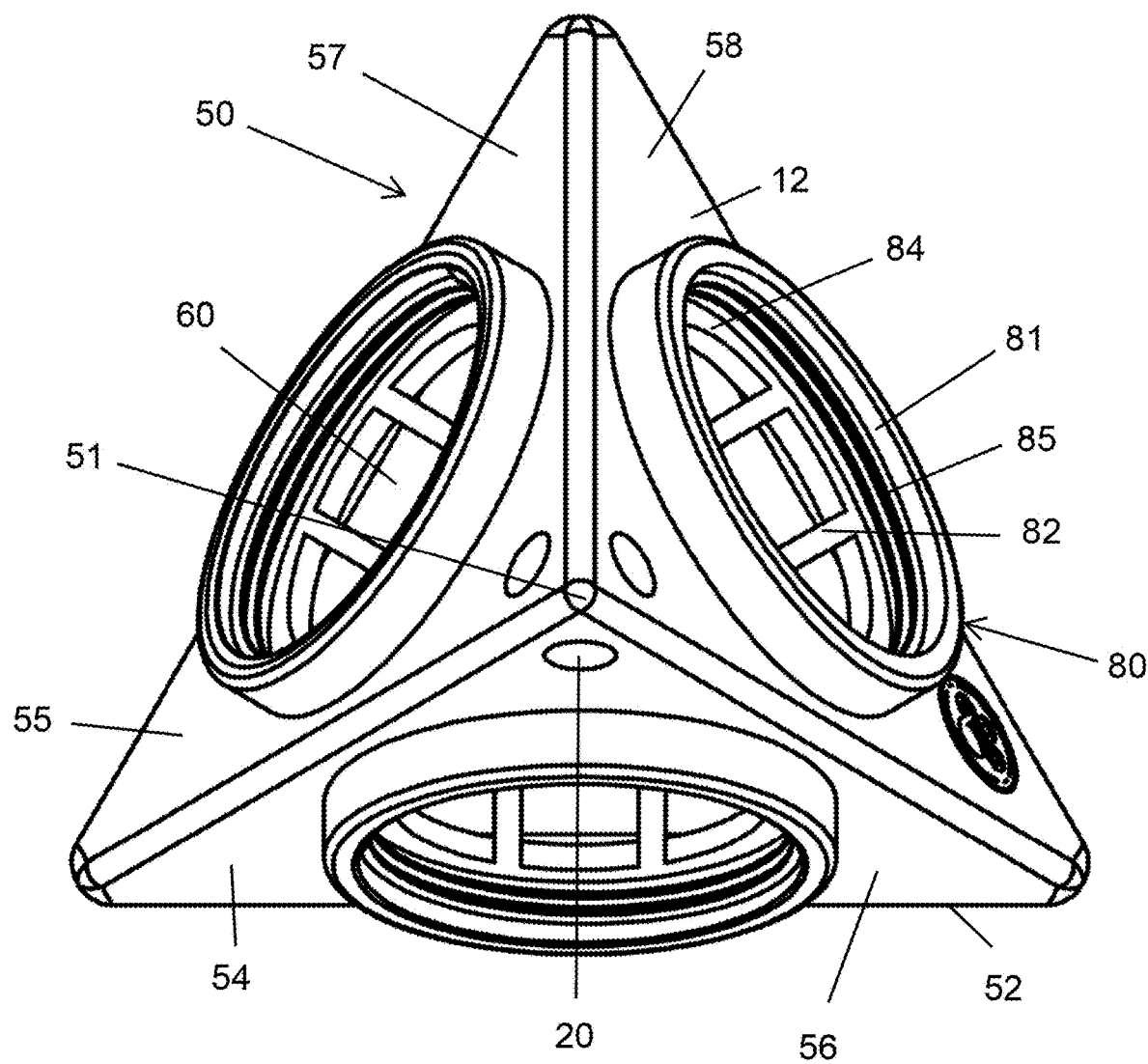
FIG. 1 is a top plan view of the housing of an embodiment of a pyramid-shaped eDNA sample collector of the present invention.
Figure 2:
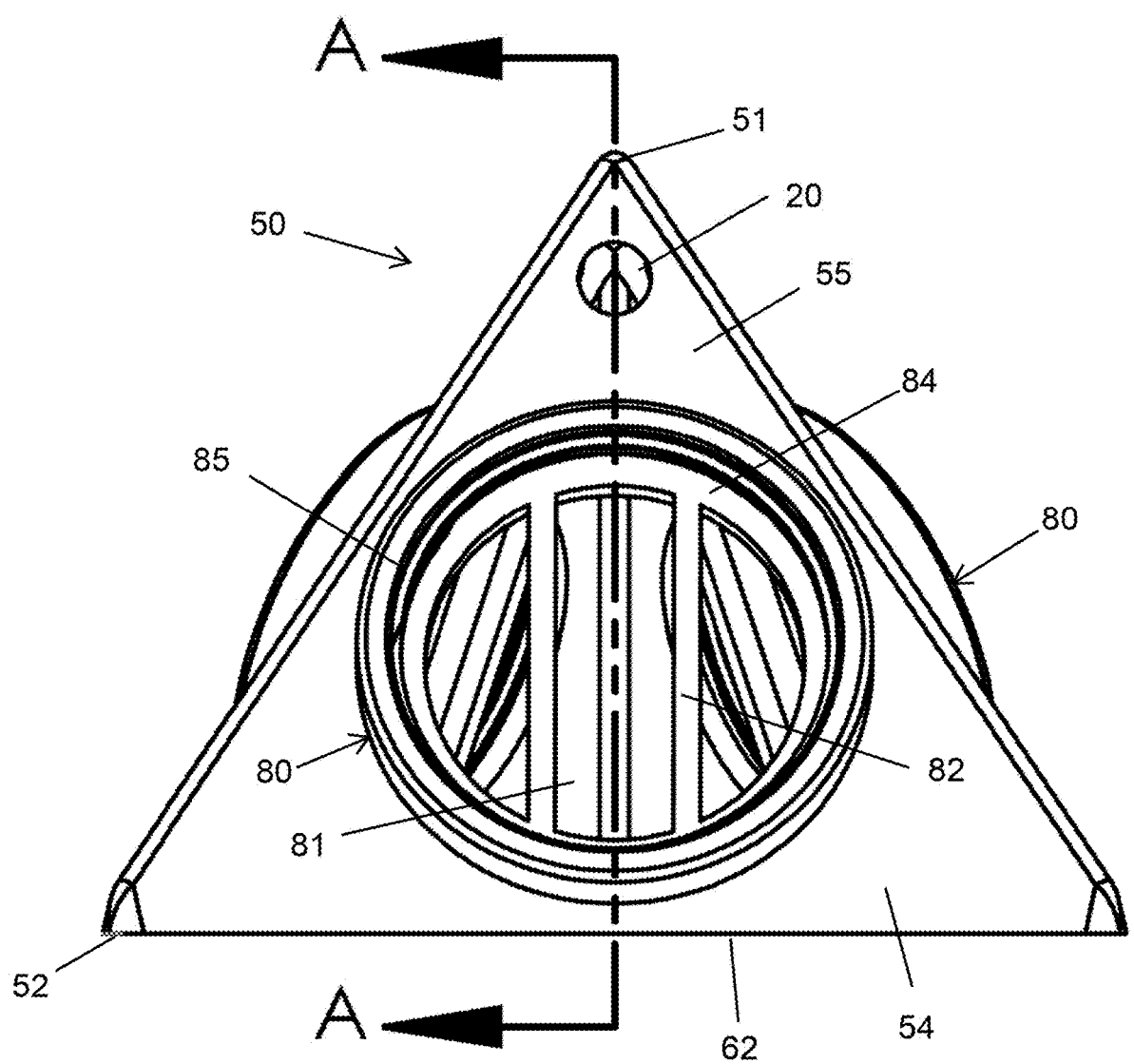
FIG. 2 is an elevation view of the housing of the sample collector of FIG. 1.
Figure 3:
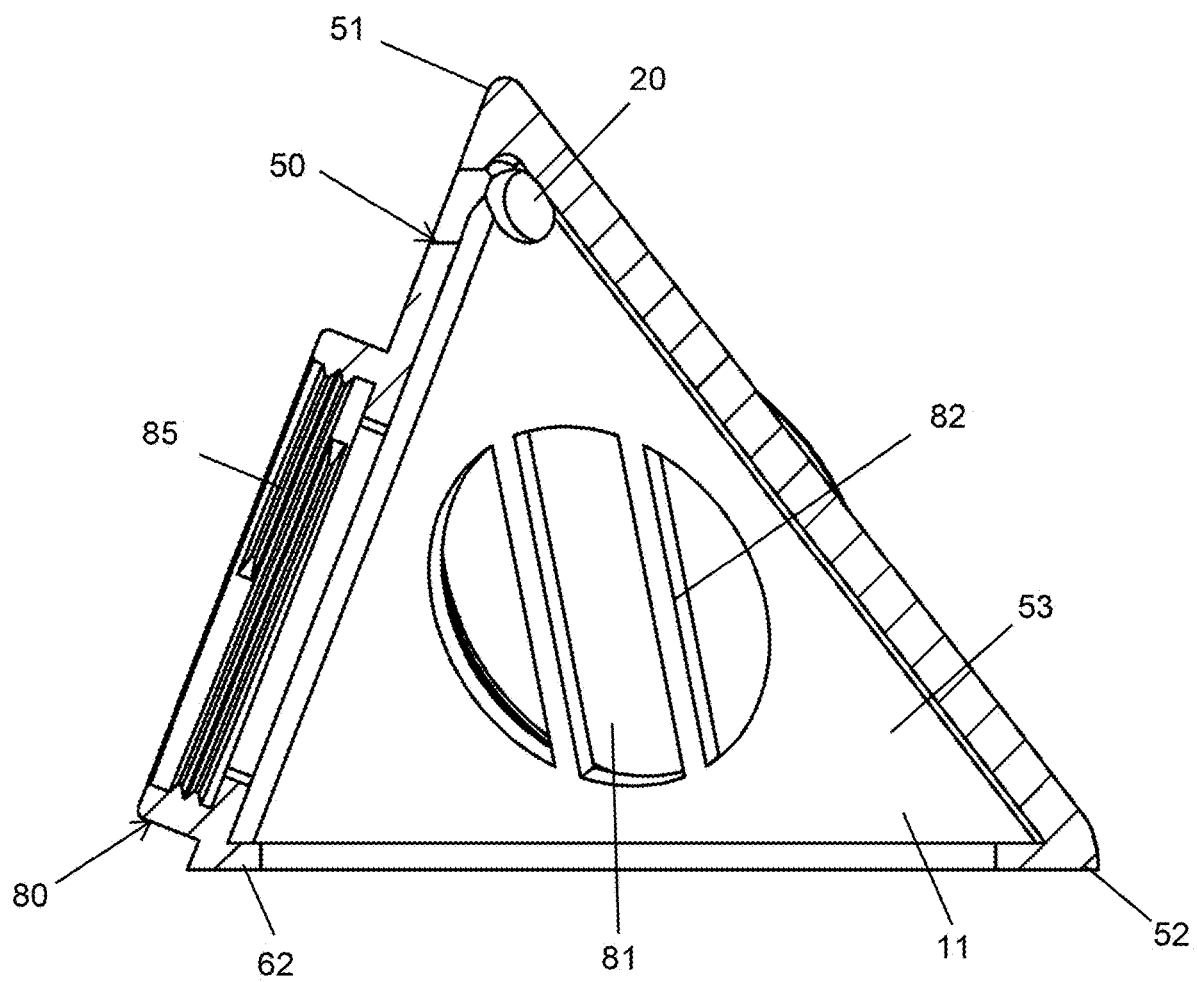
FIG. 3 is a sectional view of the housing along line A-A of FIG. 1.
Figure 4:
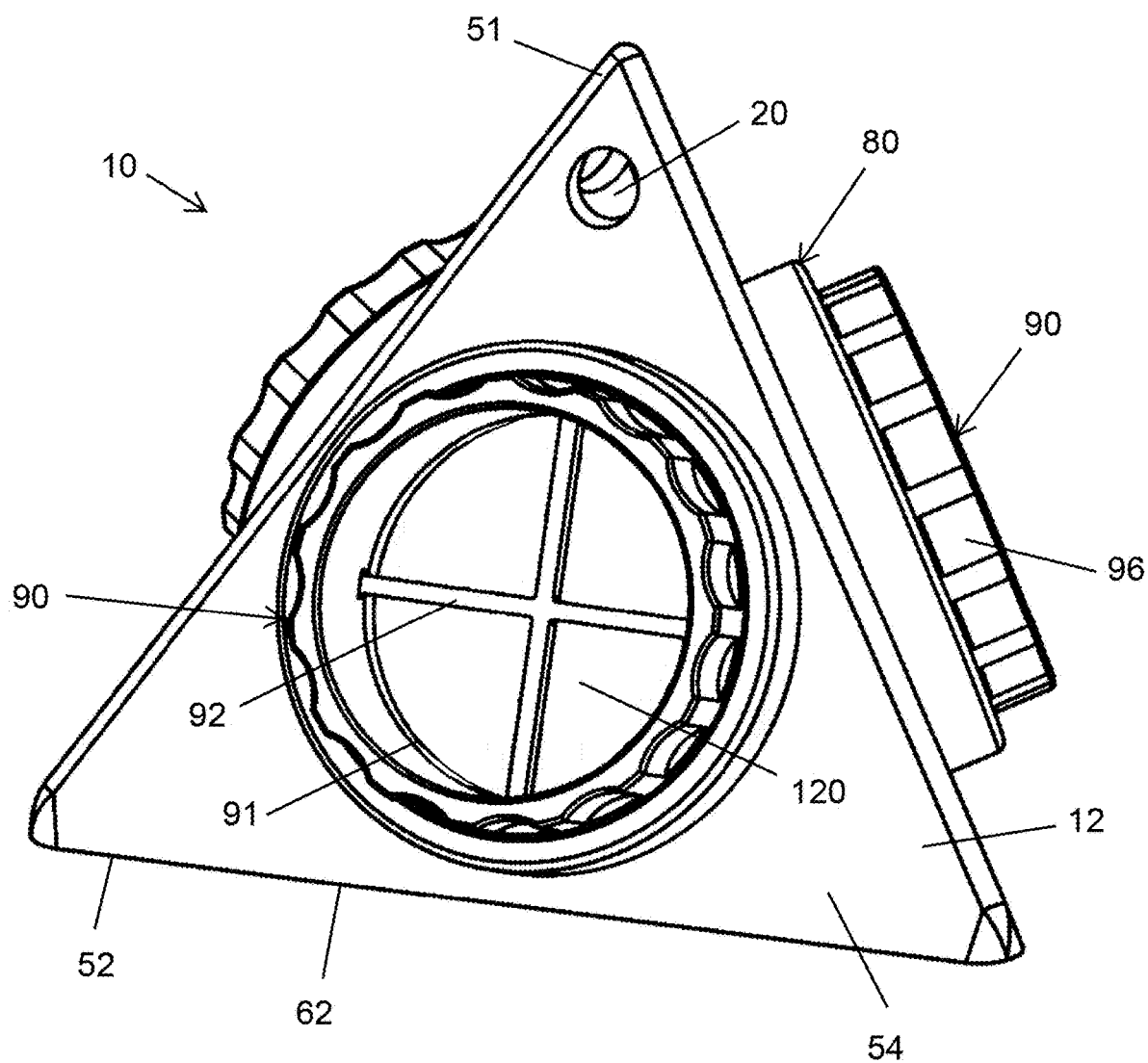
FIG. 4 is a perspective view of the sample collector of FIG. 1 including membrane retainers and a membrane.

The reference numbers in the figures have the following meanings:

| Component | Subcomponent | Reference Number |
|---|---|---|
| Sample collector | | 10 |
| | Interior surface | 11 |
| | Exterior surface | 12 |
| | Attachment mechanism | 20 |
| Housing | | 50 |
| | Upper end | 51 |
| | Lower end | 52 |
| | Interior | 53 |
| | Exterior | 54 |
| | Face | 55 |
| | First face | 56 |
| | Second face | 57 |
| | Third face | 58 |
| | Housing opening | 60 |
| | Support bar | 61 |
| | Base (bottom) | 62 |
| | Upper half | 63 |
| | Lower half | 64 |
| | L-shaped locking lug retainers | 65 |
| | L-shaped locking lugs | 66 |
| | Right side | 67 |
| | Left side | 68 |
| Slot | | 70 |
| | Upper end | 71 |
| | Lower end | 72 |
| | Slot opening | 75 |
| | Slot groove | 77 |
| Membrane receptacle | | 80 |
| | Opening | 81 |
| | Support bar | 82 |
| | Peripheral support surface | 84 |
| | Grooves | 85 |
| Membrane holder | | 90 |
| | Opening | 91 |
| | Support bar | 92 |
| | Peripheral support surface | 94 |
| | Threads | 95 |
| | Gripping surface | 96 |
| | Guide rail | 97 |
| | Inner face | 98 |
| Membrane insert | | 100 |
| | Inner face | 101 |
| | Outer face | 102 |
| | Right side | 103 |
| | Left side | 104 |
| | Membrane insert openings | 105 |
| | Recessed area | 107 |
| Membrane | | 120 |
| | Inner face | 121 |
| | Outer face | 122 |
| Connecting elements | | 130 |
| | Projection | 131 |
| | Recess | 132 |
| | Connecting slot | 133 |
| | Flange | 134 |
| | Slot open end | 135 |

DETAILED DESCRIPTION

Definitions

As used herein, the following terms and variations thereof have the meanings given below, unless a different meaning is clearly intended by the context in which such term is used.

Terms of relative position or orientation used herein, such as "above," "below," "between," etc., refer to a relative position of one component of the present sample collector with respect to other components. In addition, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

"Environmental DNA" (eDNA) refers to nuclear or mitochondrial DNA that is released from an organism into the environment. Sources of eDNA include secreted biological material (feces, mucous, and gametes), shed materials such as skin and hair, and the remains of organisms. eDNA can be in cellular or extracellular (dissolved DNA) form.

"Face" refers to a structural component of the present device having an exterior surface.

"Flange" refers to a projecting mechanical component, such as a rib or tongue, which guides and/or allows attachment to another component.

An "interference fit," also called a friction fit, refers to a fastening between two components with mating parts which are held together by friction after the parts are pushed together or otherwise placed in intimate contact with each other.

"Membranes" as used herein refer to thin, flexible structures for binding and retaining eDNA or other biological materials. A variety of materials known to the art, such as nitrocellulose and other paper-like or cellulosic products, can be used to form such membranes.

"Slot" refers to a long, narrow groove, depression, or opening into which a side of a planar membrane holder can be placed.

Product

The present eDNA sample collector comprises a durable structure for holding filter paper membranes for the collection of environmental DNA (eDNA) and other biological materials from a fluid environment for subsequent molecular genetic analysis. Fluids to be tested are typically aqueous liquids, but the present collectors can also be used with other environmental fluids, such as air. The sample collector can be deployed for example in ocean currents, a beach surf zone, and sublittoral and rocky intertidal coastal zones.

The outer structure of the present device can have a variety of three-dimensional shapes, for example a pyramidal or spherical shape. A pyramidal structure has a bottom-heavy design which can provide stability on a seafloor for collecting eDNA from a single location, while a spherical structure can advantageously be attached to fishing gear or other items for placement in a moving fluid environment during fishing or other dynamic activities. Other three dimensional shapes can also be used, however. A cube shape can be used to allow for the use of up to five or six filter membranes from a single location, for example.

In one embodiment, shown in FIGS. 1-5, the present sample collector has a pyramidal housing 50 designed for use in stationary environments. This provides device stability in a single location in a fluid environment, such as on a seafloor. In this embodiment, the sample collector 10 comprises a housing 50 having an interior surface 11, an exterior surface 12, an upper end 51, a lower end 52, an interior 53, an exterior 54, and a plurality of faces 55, which each respectively include a right side 67 and left side 68. The housing 50 preferably includes membrane receptacles on three or four faces 55 of the housing 50 for retaining membranes 120 and corresponding housing openings 60. The membrane receptacles 80 each comprise an opening 81 in fluid communication with the interior 53 of the housing 50, as well as support bars 82 and a peripheral support surface 84 which support and retain the inner face 121 of a membrane 120.

After placement of a membrane 120 in a receptacle 80, the membrane can be secured in the sample collector 10 by a membrane holder 90, whose inner face 98 faces the outer face 122 of the membrane 120. The membrane holder 90 likewise includes one or more openings 91 in fluid communication with the membrane 120 and/or with the interior 53 of the housing 50, as well as supports, such as support bars 92, and/or a peripheral support surface 94 facing the outer face 122 of the membrane in order to retain the membrane in the membrane receptacle 80. In some embodiments, the support bars 92 are in the form of a cross bar, which holds the membrane 120 in place and prevents damage from debris.

Figure 5:
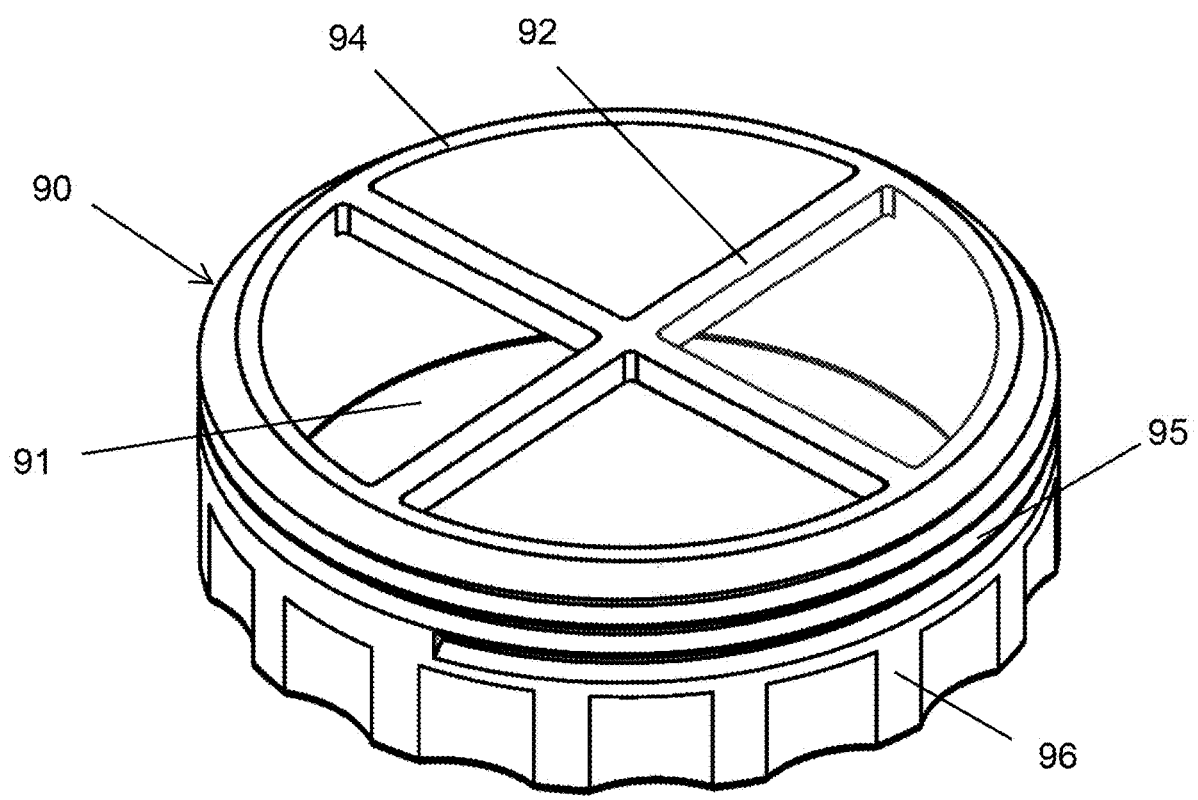
FIG. 5 is a perspective view of the membrane retainer shown in FIG. 4.
Figure 6:
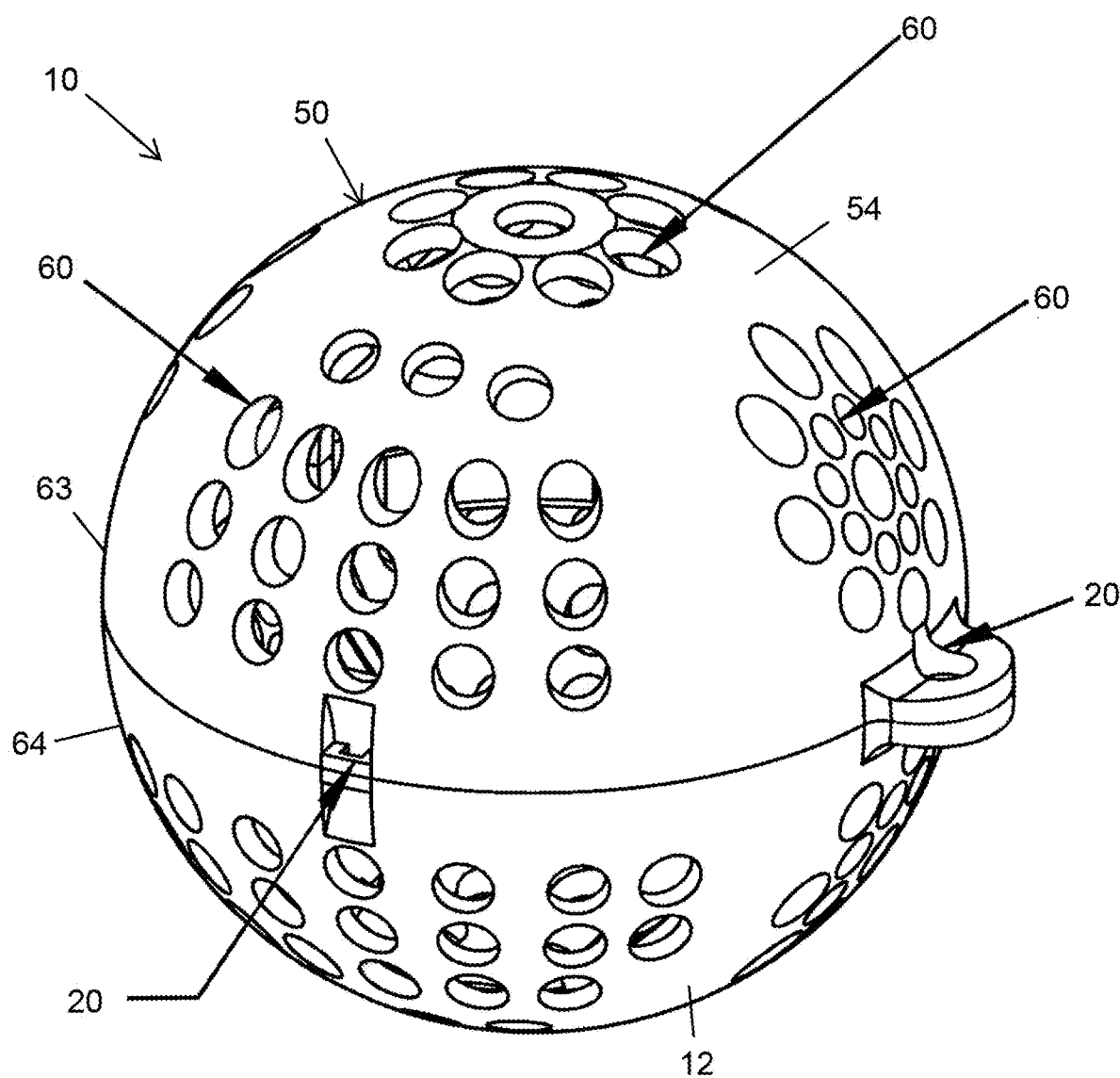
FIG. 6 is a perspective view of an embodiment of a spherical eDNA sample collector of the present invention.
Figure 7:
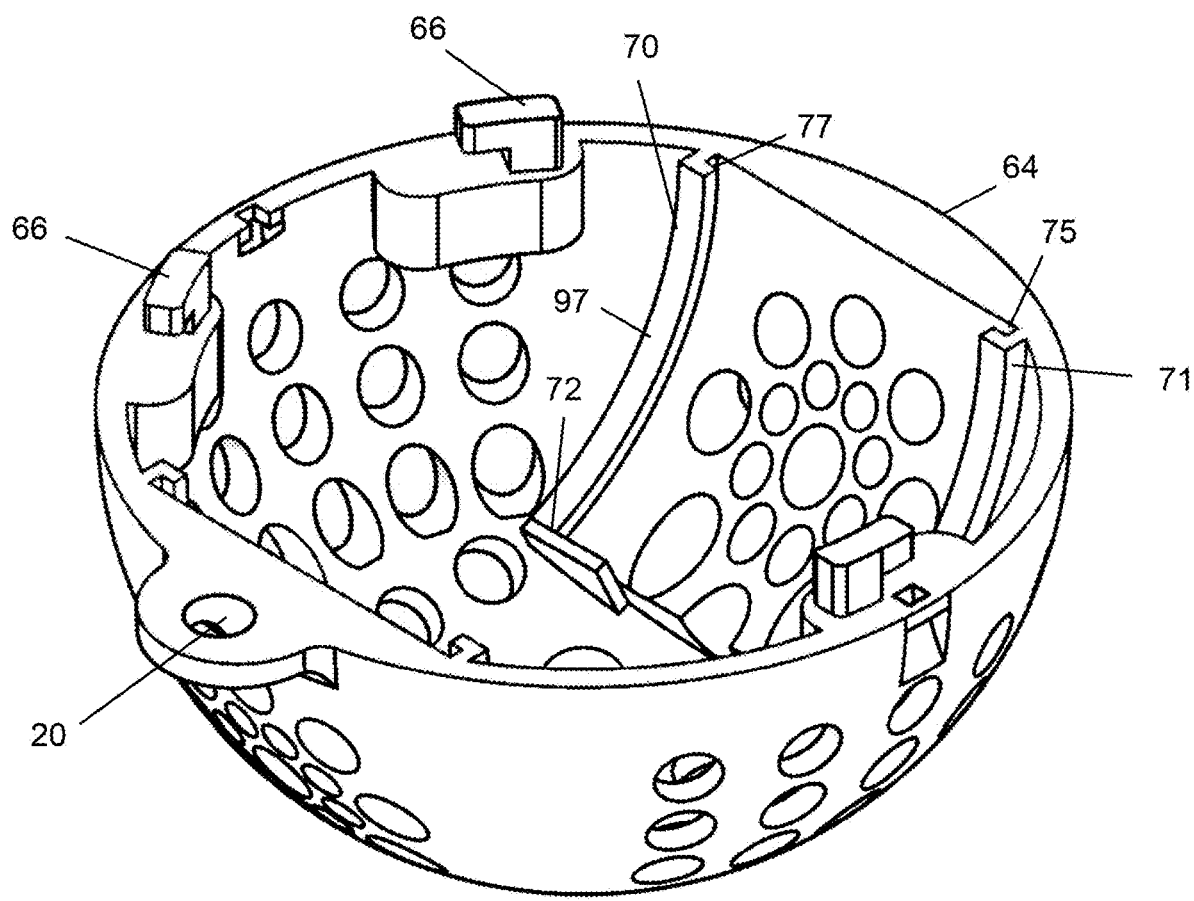
FIG. 7 is a perspective view of the top half of the sample collector of FIG. 6.
Figure 8:
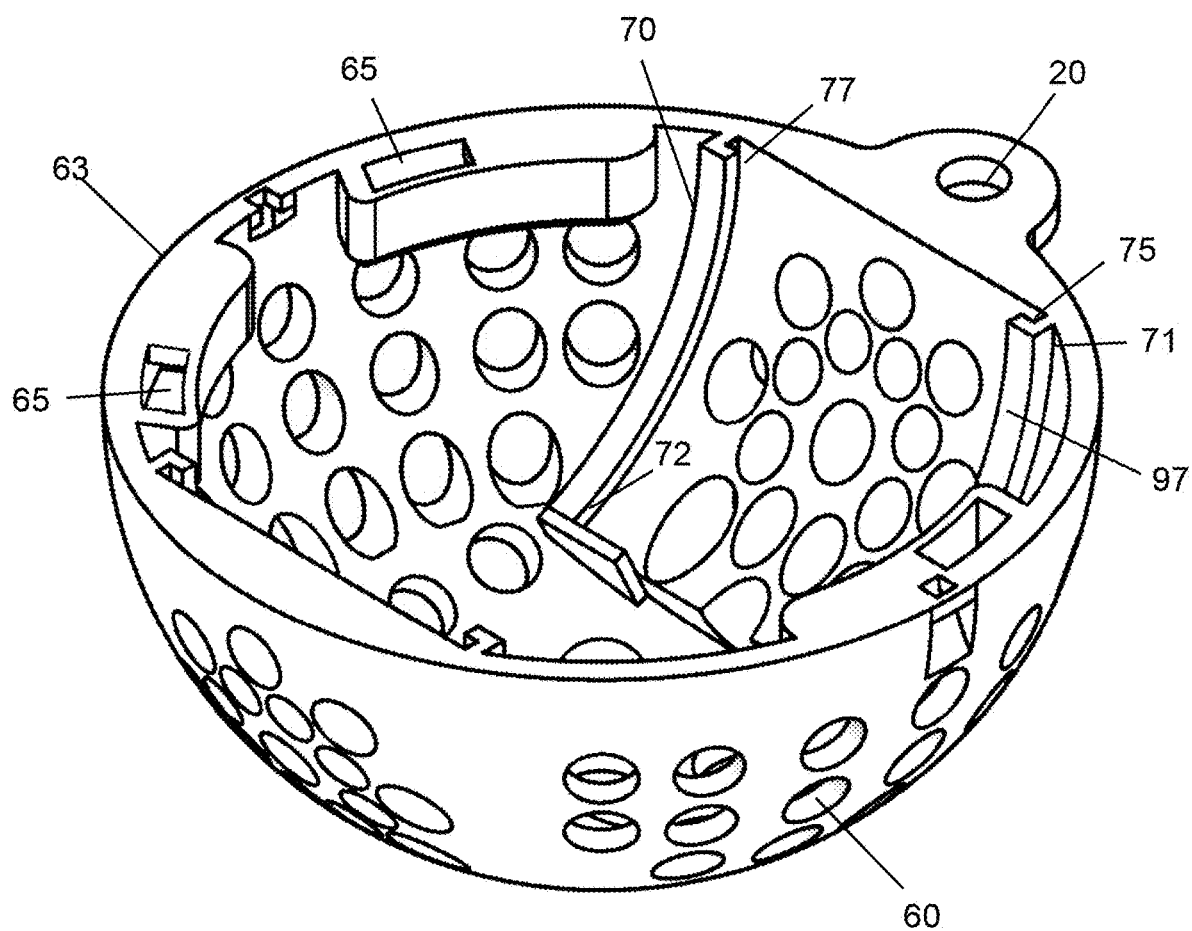
FIG. 8 is a perspective view of the bottom half of the sample collector of FIG. 6.
Figure 9:
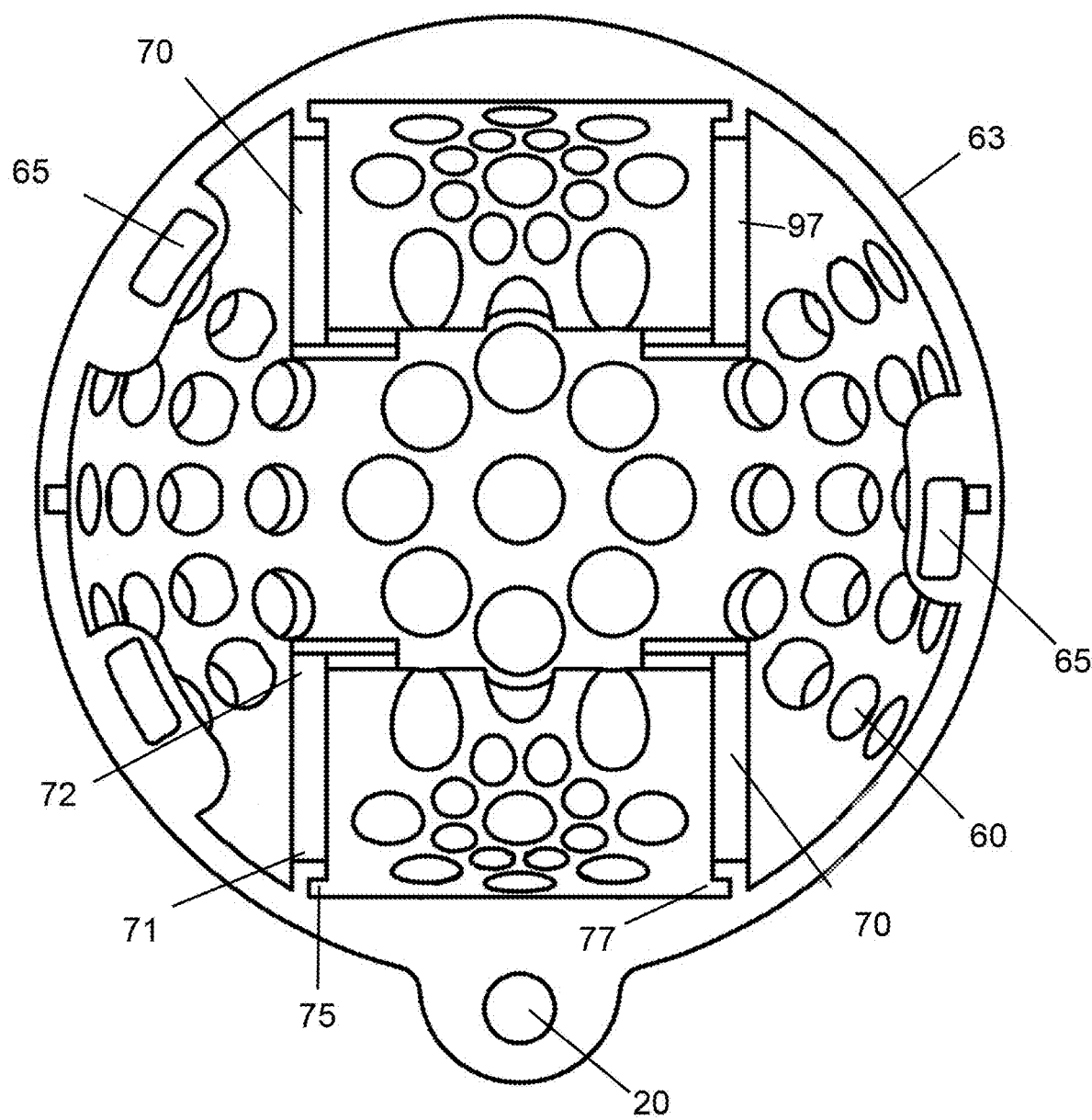
FIG. 9 is a top plan view of the bottom half of the sample collector of FIG. 6.

In one embodiment, shown in FIGS. 1-5, the membrane holder 90 is secured to the membrane receptacle 80 by rotating threads 95 around the outer periphery of the membrane holder at a proximal end into corresponding grooves 85 in a distal, outer periphery of the receptacle Preferably, the tolerance of such threads allows the membrane holder to be secured even when minor obstructions present in the environment are encountered, so that such obstructions do not prevent the membrane holder from being screwed onto the housing 50. A gripping surface 96 around the outer, distal portion of the membrane holder 90 can facilitate securing the membrane holder 90 to the housing 50, particularly in wet conditions or while wearing gloves. FIG. 5 illustrates one example of such a gripping surface, in which a series of protuberances or "knurls" extend around the periphery of the membrane holder 90. Preferably, the membrane holder 90 is reversibly secured to the receptacle 80. Other means for attaching a membrane holder 90 to the housing 50 can also be used.

In the illustrated embodiment, the receptacles 80 include two parallel support bars for supporting a membrane from the inside. This arrangement is complementary to the cross-hatch structure on the membrane holder 90 shown in FIGS. 1-5 for supporting the paper membrane from the outside. The cross-hatched pattern of the support bars holds the membrane in place while preventing damage from debris in the water. The base (bottom) 62 of this embodiment can include a membrane receptacle, or can be open, i.e., so that it does not retain a membrane, in order to facilitate water flow and also the drainage of debris. At the upper end 51 of the housing 50, one or more attachment mechanisms 20, such as attachment holes, can be provided to allow for attachment of the sample collector 10 to a carabiner or to another attachment mechanism.

A spherical embodiment of the present sample collector is shown in FIGS. 6-11. In this embodiment, the housing 50 is spherical in shape in order to allow for unobstructed movement of the housing 50, as well as to lower the likelihood of the sample collector becoming lodged between rocks or seafloor objects, for example when the present sample collector 10 is used in a moving fluid environment. The housing 50 in this embodiment preferably includes a plurality of openings in order to allow fluid flow between the interior and exterior of the housing. Advantageously, the openings 60 in this or other embodiments can be 8 mm to 10 mm in diameter.

The housing in the spherical embodiment is preferably formed in two halves, an upper half 63 and a lower half 64, which can be separated in order to provide access to the interior 53 of the housing 50. The upper half 63 and lower half 64 can be secured in any manner known to the art, but in the illustrated embodiment the lower half 64 includes three slightly oversized female portions of locking lugs 65 for smoothly securing the lower half 64 to L-shaped locking lugs 66 in the upper half 63. Two attachment slots, such as for zip ties, are also provided as attachments 20 to further secure the two halves together.

Figure 10:
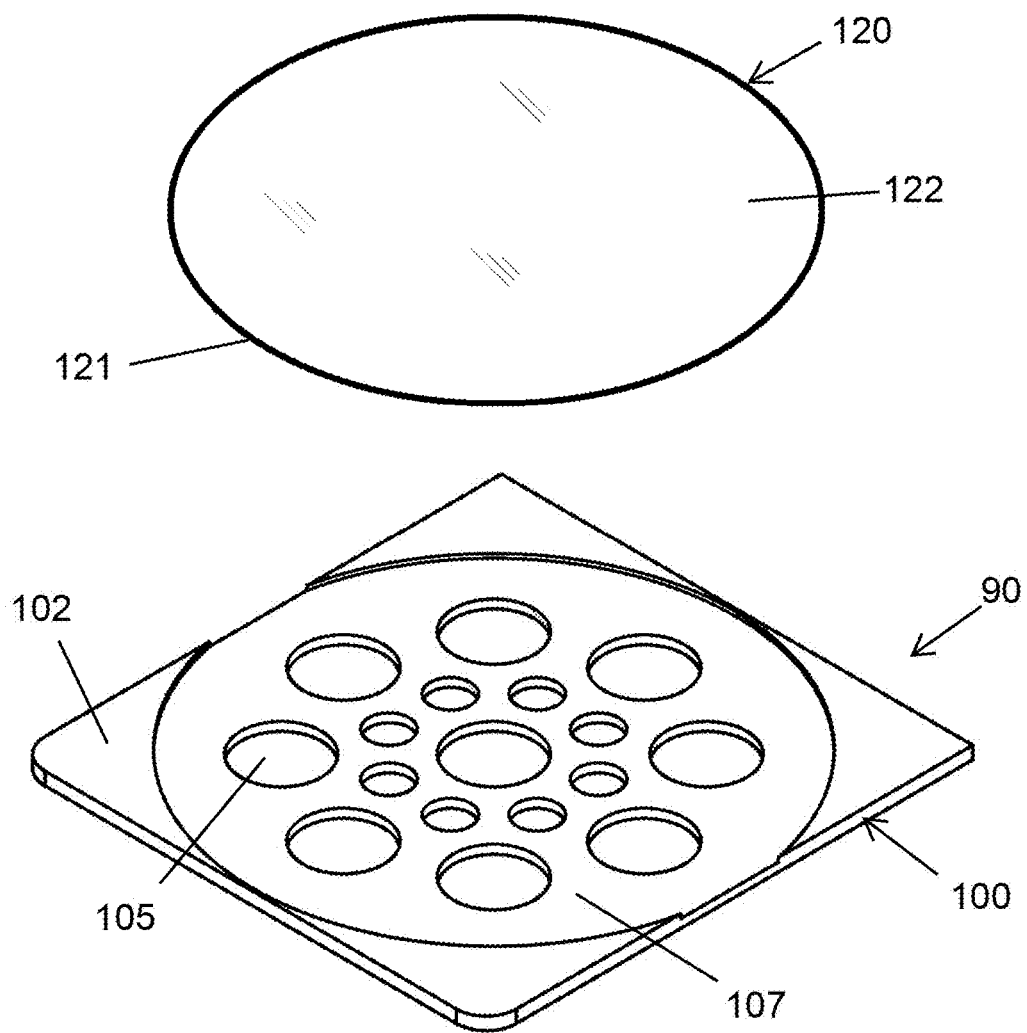
FIG. 10 is a perspective view of a membrane and a planar membrane retainer for the sample collector of FIG. 6.
Figure 11:
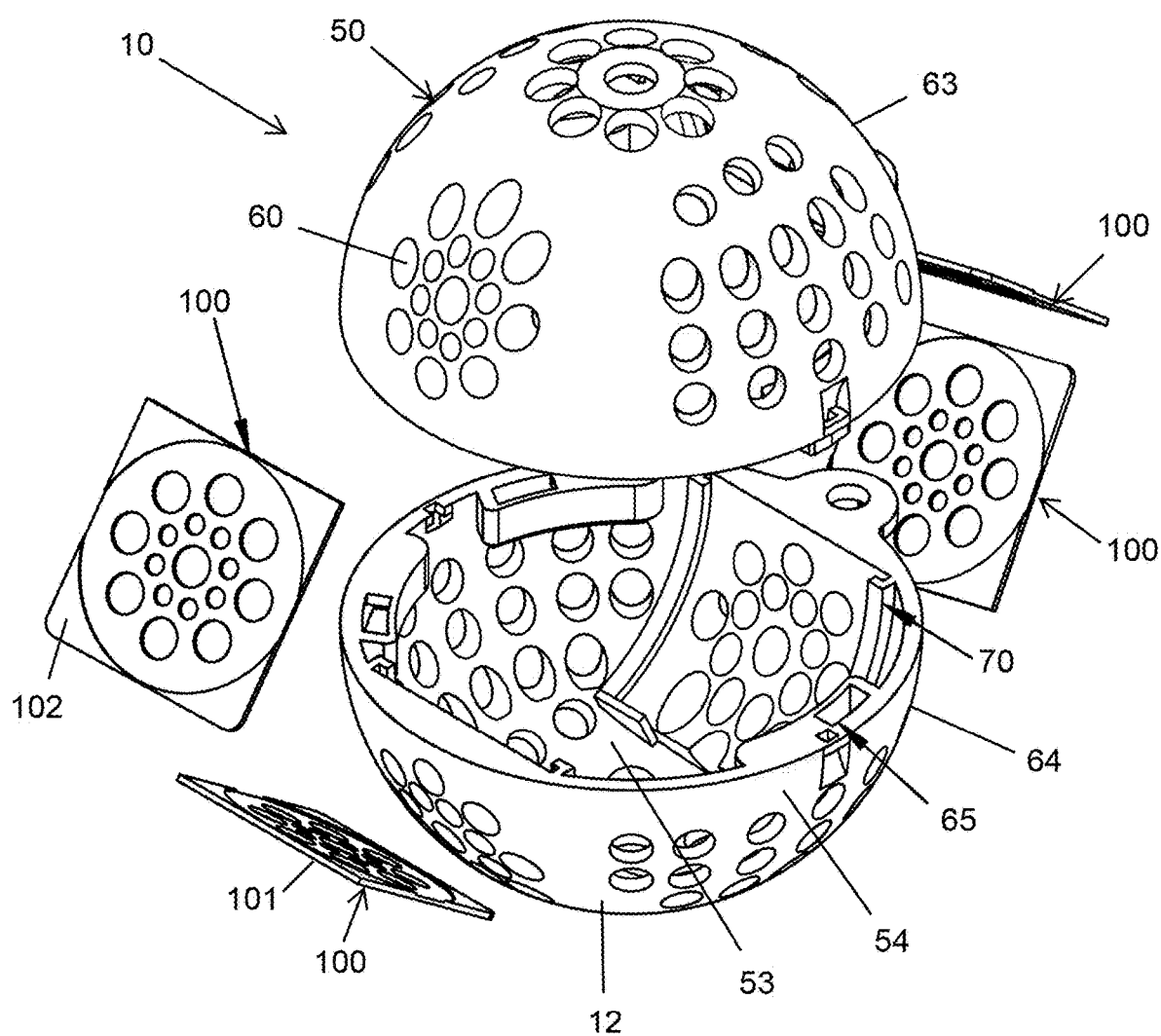
FIG. 11 is an exploded view of the sample collector of FIG. 6.
Figure 12:
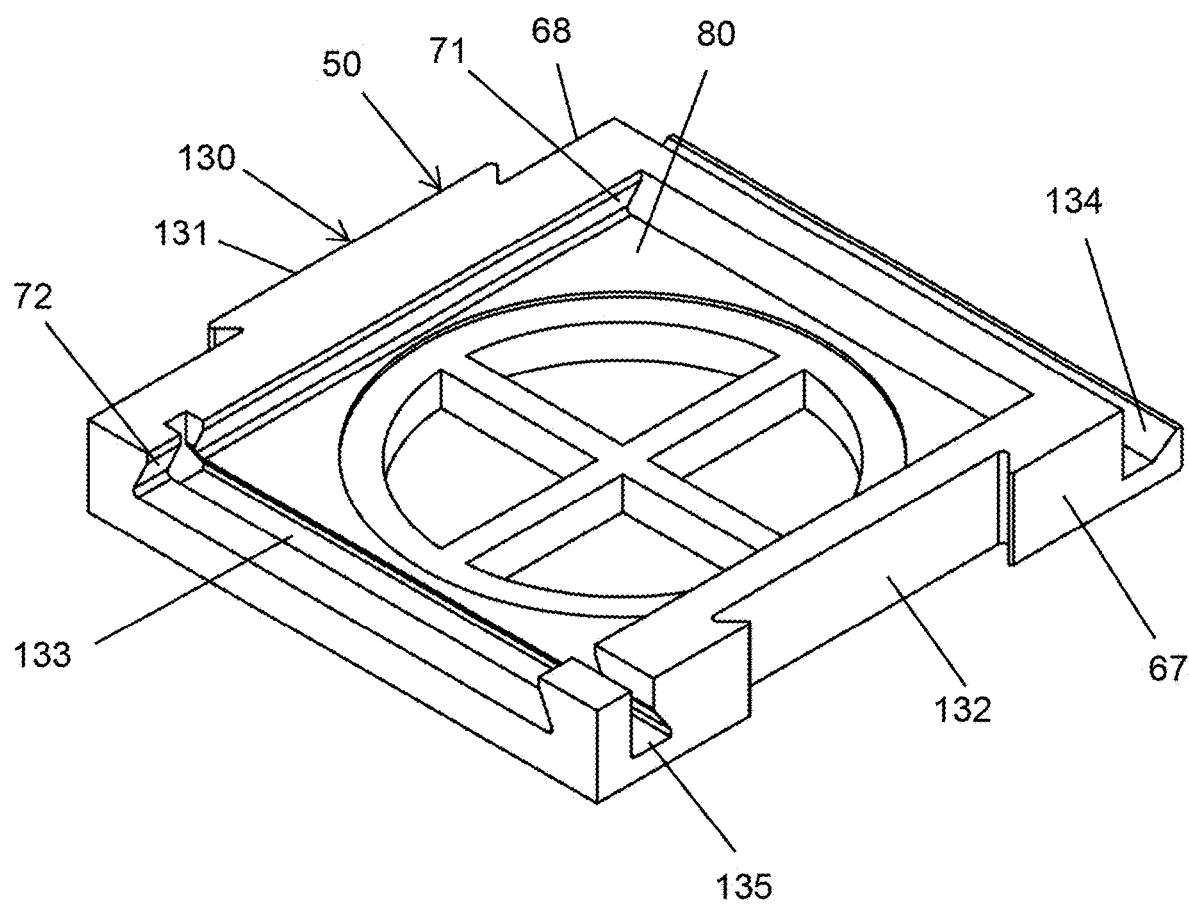
FIG. 12 is a right side perspective view of another embodiment of the eDNA sample collector of the present invention.
Figure 13:
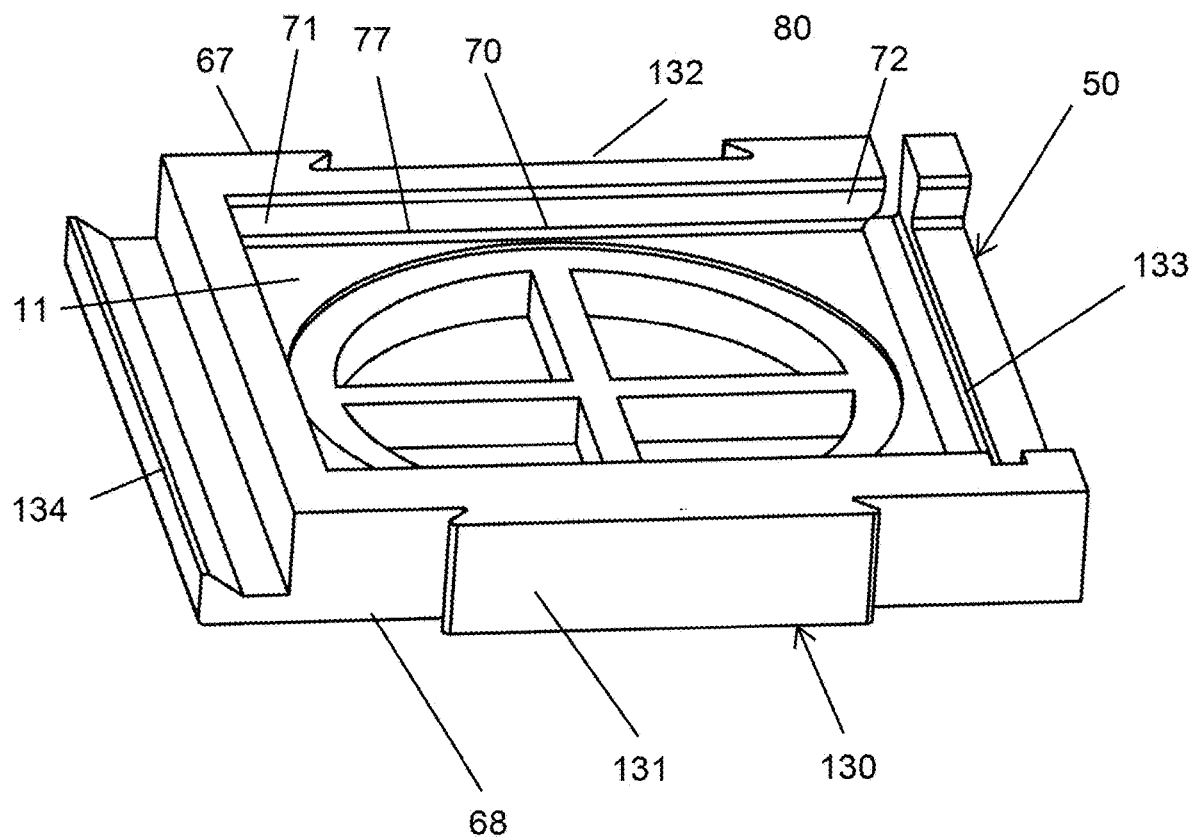
FIG. 13 is a left side perspective view of the sample collector of FIG. 12.
Figure 14:
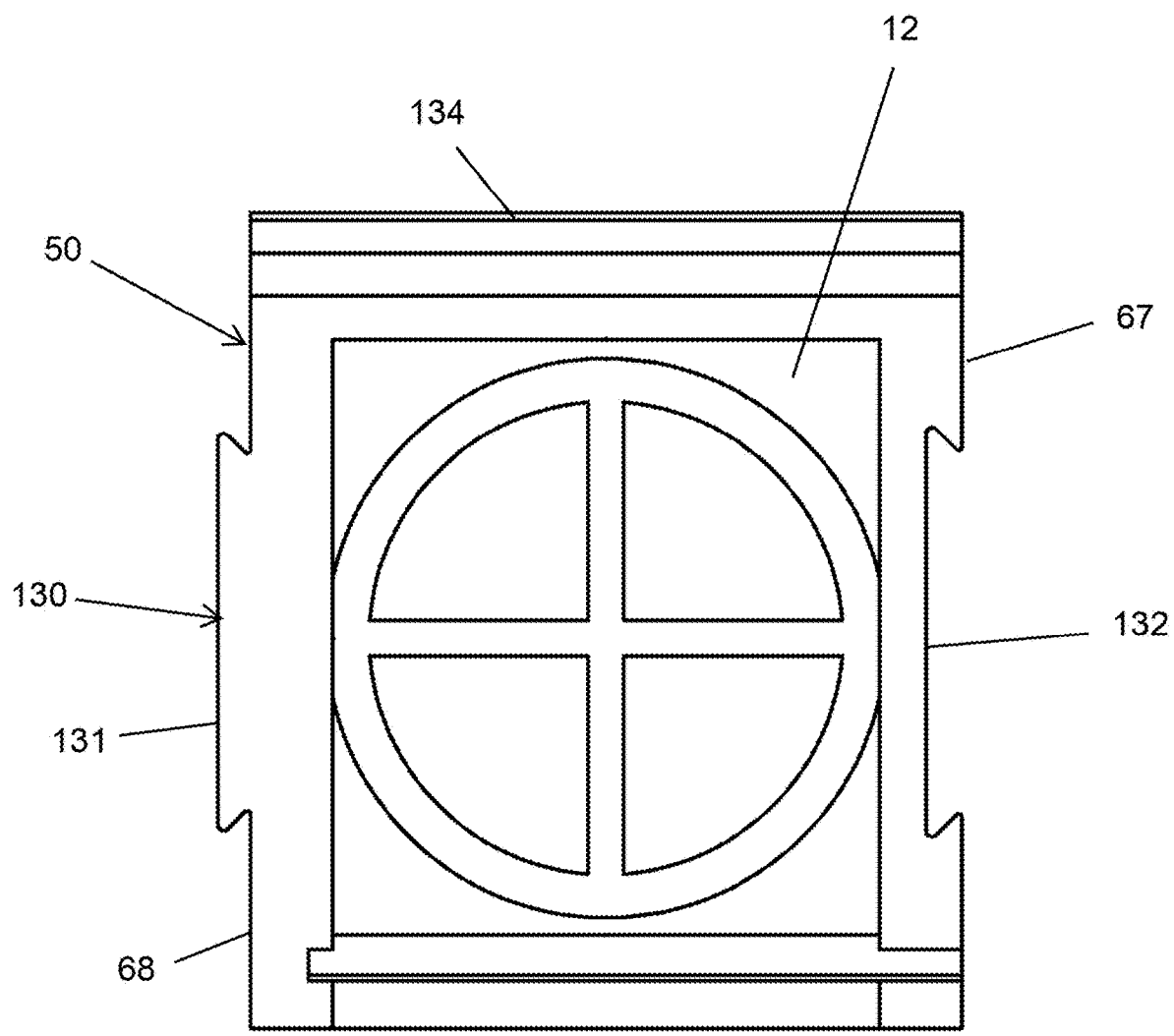
FIG. 14 is a top plan view of the sample collector of FIG. 12.
Figure 15:
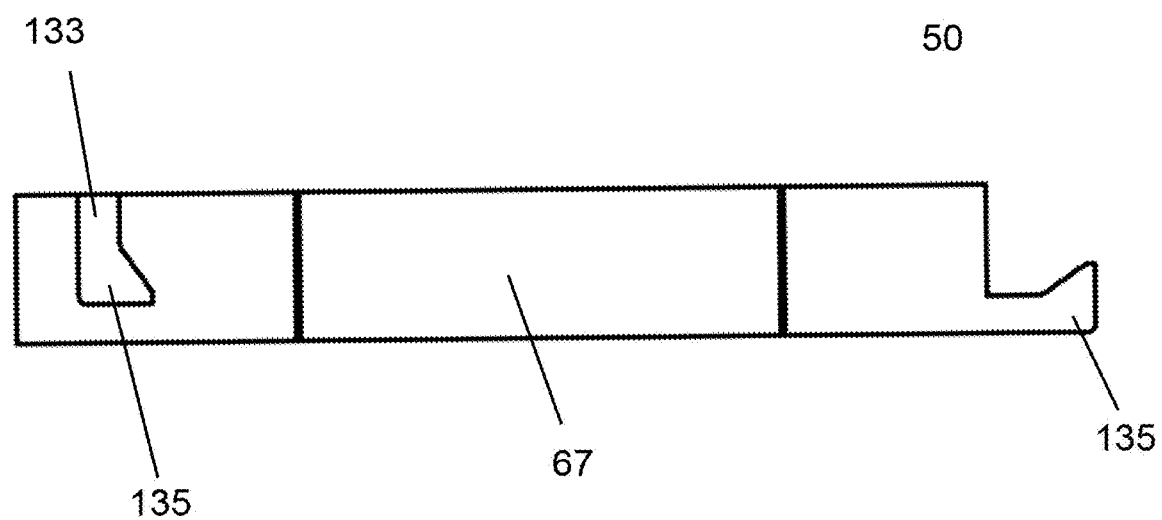
FIG. 15 is a right side elevation view of the sample collector of FIG. 12.
Figure 16:
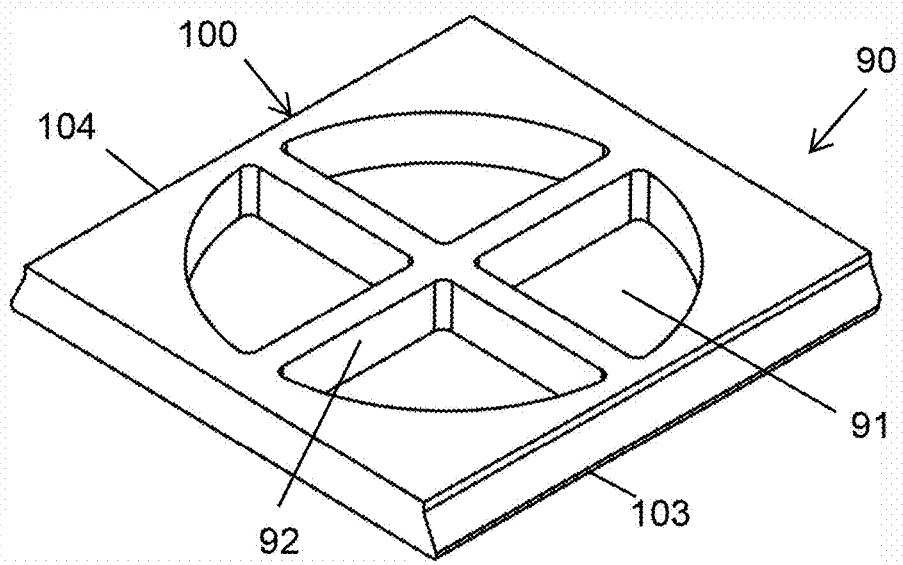
FIG. 16 is a perspective view of a planar membrane retainer for the sample collector of FIG. 12.
Figure 17:
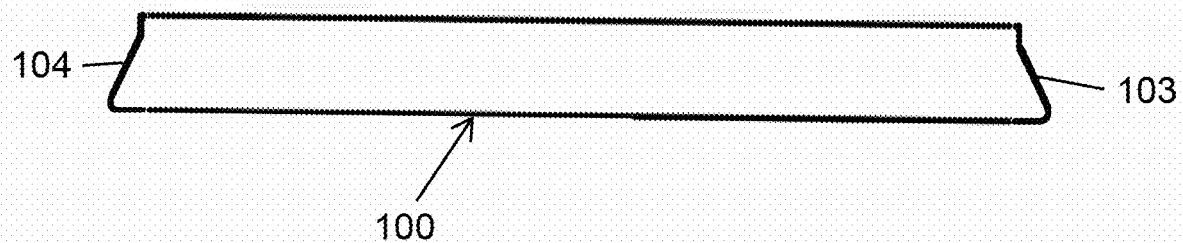
FIG. 17 is a side elevation view of the planar membrane retainer of FIG. 17.
Figure 18:
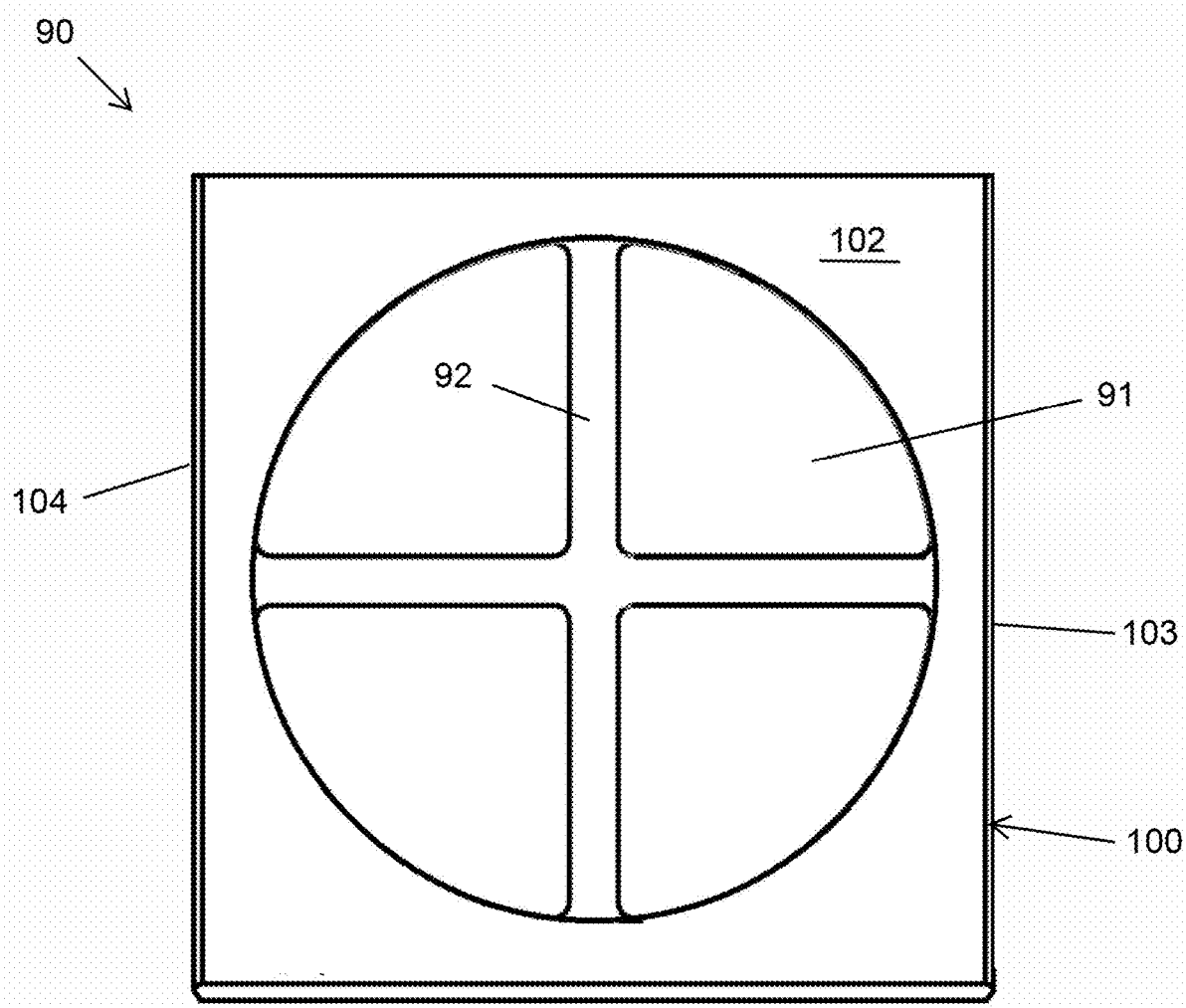
FIG. 18 is a bottom plan view of the planar membrane retainer of FIG. 17.
Figure 19:
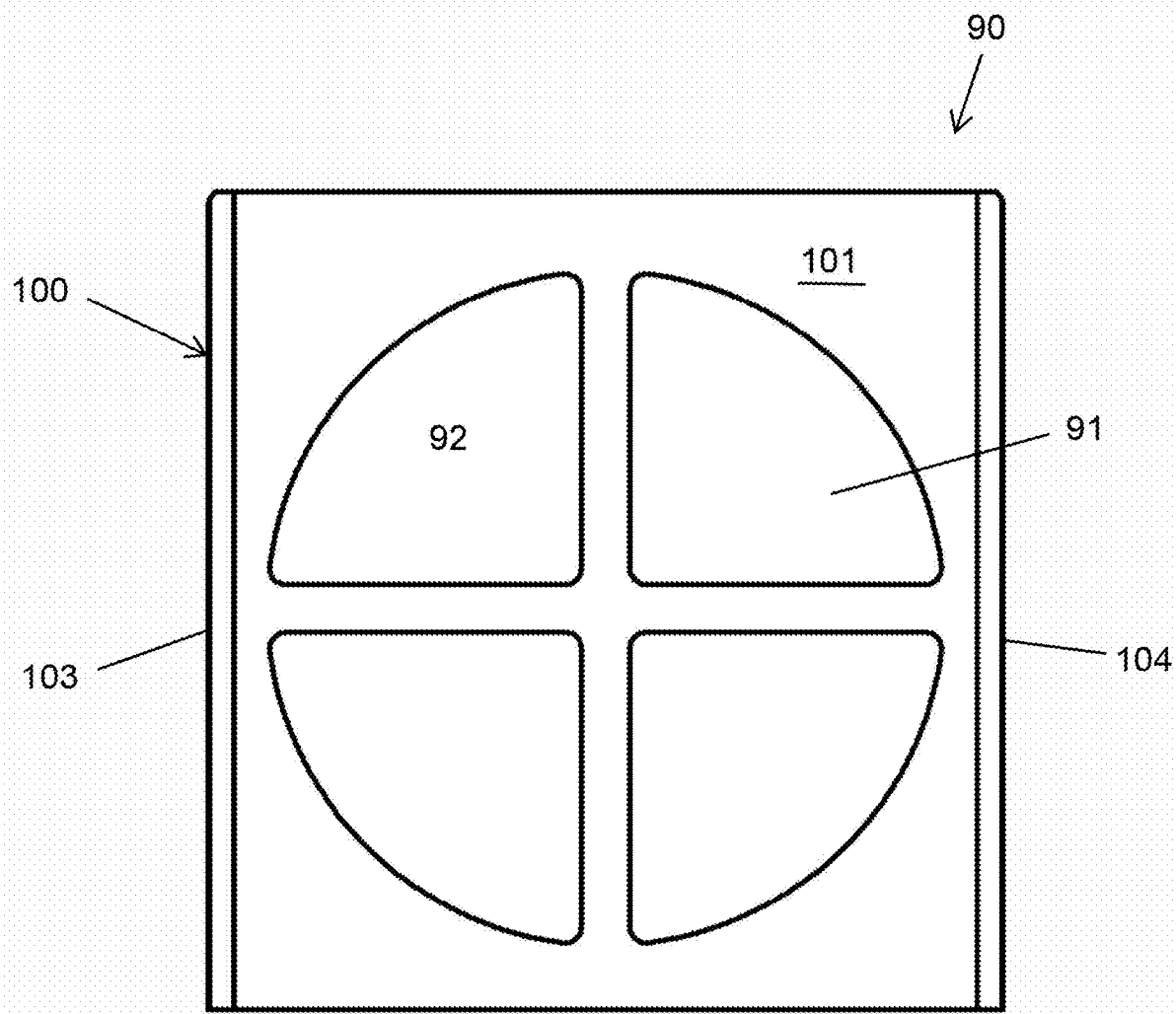
FIG. 19 is a top plan view of the planar membrane retainer of FIG. 17.

The upper and lower halves of the housing 50 can each include one or more membrane receptacles 80, with two in each half of the illustrated spherical housing 50. The membrane receptacles 80 in this embodiment include a pair of slots 70 having grooves 77 and guide rails 97. In order to secure a membrane 120 within the receptacle 80 in this embodiment, a membrane holder in the form of a planar panel or insert 100 is placed through the openings 75 of the slots 70, either together with or after placement of a membrane 120, which retain a membrane 120 when it is inserted through the slots with the outer face 102 of the insert 100 facing the inner face 121 of the membrane 120. The membrane insert 100 is preferably a flexible planar panel having one or more openings 105 and a pair of approximately parallel sides, wherein each parallel side of the panel is adapted to be placed through the opening 75 and into the groove 77 of a corresponding slot 70. The insert 100 can be made from a polymer material and have a thickness of 1.25 mm, for example, to allow enough flexibility to be able to slide membranes into the slots 70, yet sufficient strength to hold the paper membrane in place in fluid. As shown in FIG. 10, the insert 100 preferably has recessed area 107 for retaining a membrane 120, which can be for example about 0.4 mm in depth, so that a membrane 120 can lie flush with the surface of the insert 100 when they are inserted together into the receptacle 80. The membrane inserts 100 preferably include openings 105 to allow fluid flow therethrough.

In a further embodiment, shown in FIGS. 12-19, the housing 50 can be configured to retain a single membrane 120. In this embodiment, the membrane holder 90 is a planar membrane insert or panel 100 having one or more openings 91 as shown in FIGS. 16-20. The membrane receptacles 80 in this embodiment include a pair of approximately parallel slots 70 having grooves 77 which retain the membrane holder 90 when it is inserted through the openings 75 of the slots In order to secure a membrane 120 within the receptacle 80 in this embodiment, a membrane 120 is placed in the receptacle 80, with the outer face 122 of the membrane facing the interior surface 11 of the housing 50. The sides of the insert 100 are then placed through the slots 70, with the inner face 101 of the insert 100 facing the inner face 121 of the membrane 120. The membrane insert 100 has a pair of approximately parallel sides, right side 103 and left side 104, where each parallel side of the insert 100 is adapted to be placed through the openings 75 and urged from a lower end 72 of the slot 70 to an upper end 71 in order to cover a membrane 120 in the receptacle. The insert 100 is retained within the slots with an interference fit and is sufficiently rigid to be retained in the slots 70 when the sample collector 10 is subjected to a fluid flow, thereby retaining the membrane 120 within the receptacle 80.

This embodiment of the present sample collector 10 can advantageously be mechanically attached to one or more other single-membrane eDNA sample collectors in order to form a collection of such sample collectors. Such mechanical connection can be accomplished in various ways known to the art, but in the embodiment of FIGS. 12-19, a side of one sample collector can be attached to a side of another sample collector through an interference fit with connecting elements 130. For example, the right and left sides of the housing 50 can be provided with mutually fitting locking or connecting elements 130, with the left side 68 of the housing able to be attached to the right side 67 of the housing of a second sample collector in a tongue-and-groove fashion, i.e., such that a projection 131 on one side of the housing fits within a receiving portion or recess 132 of the other side of the housing of a second sample collector 10 of the same design. In the illustrated embodiments, the projection 131 is a laterally flaring wedge 131 on the left side 68 of the housing 50 fits within a recess 132 formed in the right side 67 of a second sample collector. The wedge forms an interference fit with the groove or recess 132 in order to securely retain one sample collector 10 to the second sample collector. Differently configured projections can also be used, such as a rounded sphere adapted to fit in a corresponding rounded hole.

One or more sample collectors 10 in the embodiment of FIGS. 12-19 can also be mechanically connected to additional sample collectors on the upper and/or lower ends of such sample collectors. In the embodiments of FIGS. 12-19, this is accomplished by providing a flange 134 in the upper end 51 of the housing which can be connected to a connecting slot 133 in the lower end 52 (though these placements of the flange 134 and connecting slot 133 can also be reversed). The flange 134 is configured to fit within an open end 135 of the connecting slot 133 so that the flange 134 can be urged through the connecting slot 133 from the right side 67 of the housing to the left side 68. When the flange 134 is inserted into the connecting slot 133, the flange lies below the slot 70 which retains the membrane insert 100 through an interference fit. This allows the membrane insert 100 to be inserted and removed while the flange connects one sample collector 10 to another sample collector in this way.

The housing 50 of the sample collector 10 can be produced in an any number of ways known to the art. In one embodiment, the housing 50 is formed from a polymer material, and preferably can be 3D printed. The housing can be about 3 mm in thickness for strength in this case. The use of 3D printing technology for manufacturing purposes allows for the ability to select biodegradable 3D printing materials in order to avoid contributing to marine plastic debris, should the device be lost at sea.

The present eDNA sample collector 10 is preferably designed to secure three or more membranes 120, in order to be able to gather sufficient data to be statistically significant (e.g., triplicate readings are obtained from a sample collector with 3 membranes). The number of membranes used with a sample collector 10, or the number of sample collectors used together, can be increased in order to increase the capacity of the sample collector and the statistical power of the data it can provide.

The membranes 120 are preferably made from a filter paper material, such as nitrocellulose. Such material is inexpensive and is adapted for use in binding DNA and/or protein from samples. In one embodiment, such filter paper can have a diameter of 4.7 cm. Other membrane materials can also be used, such as charged nylon (e.g., Biodyne™ B) or a noncharged cellulose ester (e.g., Pall GN-6 Metricel®). Other membrane materials known to the art can also be used.

eDNA can be extracted and analyzed using methods known to the art. For example, commercially available DNA extraction kits can be used, such as those available from Qiagen and Zymo Research.

Method of Use

The present sample collector 10 can be placed in a variety of fluid environments to obtain samples of biological materials such as eDNA. In one embodiment, the present sample collector can be used to obtain eDNA samples from commercial fishing grounds or from the holds of commercial fishing vessels, in order to verify the species of fish being caught. A sample collector can be deployed for a sufficient time to retain the designed biological material, for example by placing it in a single location in target fishing grounds (i.e., in a stationary environment device) or can be attached to fish-bait lines of small-scale and commercial fishing vessels (i.e., in a dynamic environment).

Example

To investigate how ocean flows pass through the eDNA sample collector, we conducted experiments to measure fluid exit velocities with varying entrance speeds for the pyramidal sample collector. Our experimental analysis used the Particle Image Velocimetry (PIV) method to measure fluid entrance and exit speeds. Neutrally-buoyant 20 micrometer hollow glass spheres were seeded in a tank containing a pyramidal eDNA sample collector, and an aquarium pump was used to generate an initial horizontal flow aimed directly at the sample collector. Initial flow speeds were ~5 cm/s, representative of average surface ocean speeds (not near any land). The hollow glass spheres (PIV particles) are highly reflective and move with the flow, and images for analysis using the PIV method were taken using a Canon EOS T7 DSLR camera at a frame rate of 24 frames/sec as the particles passed through a laser sheet that bisects the sample collector.

The flow of fluid at the boundary between the sample collector and the incoming jet of fluid from the aquarium pump was approximately 10 cm/s, indicating that the flow of fluid and any eDNA it may contain will collect onto the membrane at the front of the pyramidal sample collector. There is only a small flow of fluid through the sample collector. Behind the sample collector, fluid flow speeds of around 3-5 cm/s are obtained, comparable to the magnitude of the initial flow.

Figure 20:
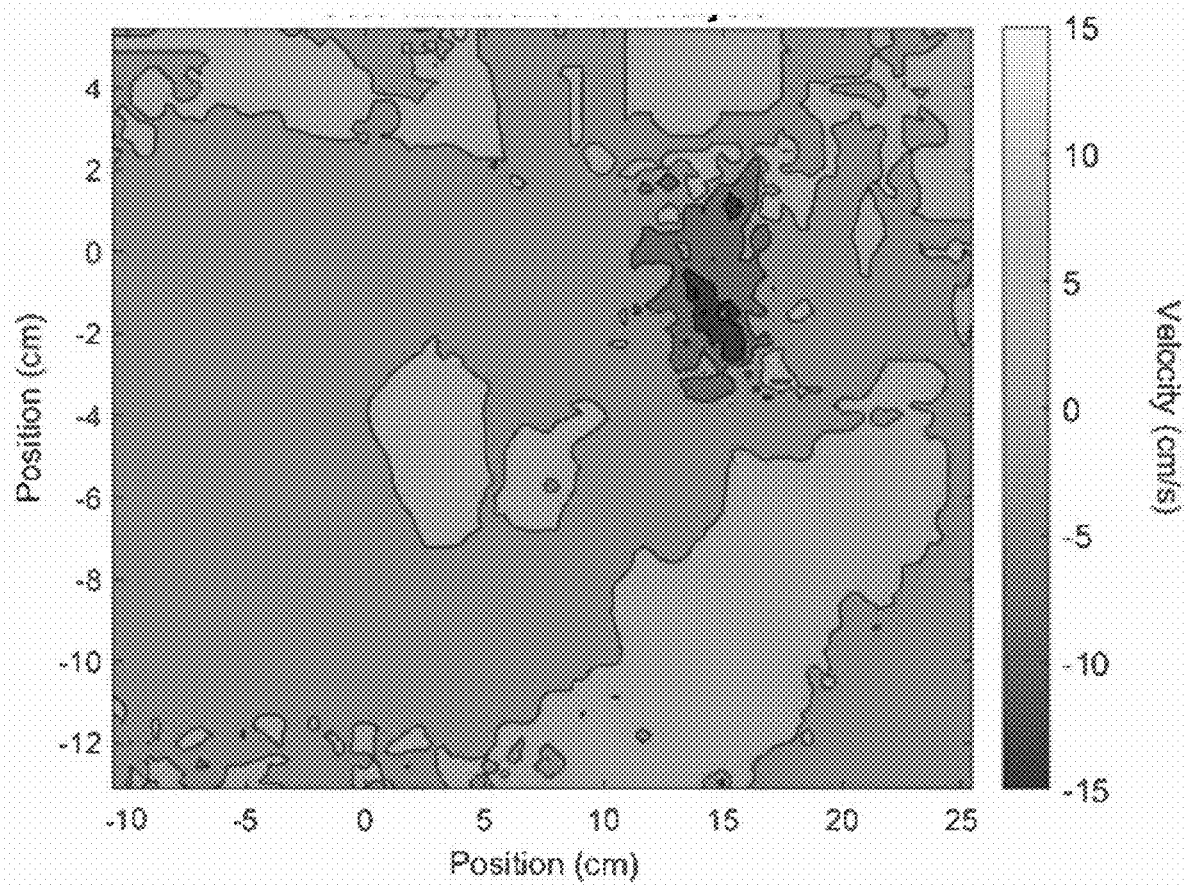
FIG. 20 is a contour plot showing how a fluid flow changes as it passes a pyramidal eDNA sample collector.

FIG. 20 shows a contour plot generated using a set of successive PIV images. The pyramidal sample collector (not shown in the contour plot) was positioned in an area of between −5 cm to 5 cm on the horizontal axis and vertically from −8 to 0 cm. The initial jet of flow from the aquarium pump of approximately 5 cm/s came from the top right corner.

The examples set forth herein are provided to illustrate certain concepts of the disclosure. Those of ordinary skill in the art will comprehend that these are merely illustrative in nature, and other examples may fall within the scope of the disclosure and the appended claims. Ranges which are described as being "between" two values are also intended to include the indicated values. Based on the teachings herein those skilled in the art should appreciate that an aspect disclosed herein may be implemented independently of any other aspects and that two or more of these aspects may be combined in various ways. All possible combinations and sub-combinations are intended to fall within the scope of this disclosure. In addition, certain steps or features may be omitted in some implementations. All patents, patent publications, and other publications referred to herein are incorporated by reference in their entireties.

What is claimed is:

1. An environmental DNA sample collector comprising:
   a rigid housing;
   a membrane receptable;
   a membrane; and
   a reversibly secured membrane holder, wherein:
      the rigid housing has an upper end, a lower end, a first face, a second face, an interior, and an exterior, wherein the first face has a first right side, a first left side, and at least one first opening between the interior and the exterior and the second face has a second right side, a second left side and at least one second opening between the interior and the exterior;
      the membrane receptacle is disposed in the housing in fluid communication with the at least one first opening or with the at least one second opening, the membrane receptacle comprising a space adapted to retain the membrane;
      the membrane is disposed in the membrane receptable and configured to capture environmental DNA from a fluid environment when the environmental DNA sample collector is positioned within the fluid environment such that the membrane contacts the fluid environment; and
      the reversibly secured membrane holder retains the membrane within the membrane receptacle.

2. The environmental DNA sample collector of claim 1, wherein the rigid housing has a shape selected from the group consisting of pyramidal and cubical.

3. The environmental DNA sample collector of claim 1, wherein the housing has a pyramidal shape and comprises:
   the first face, the second face, and a third face having a third right side and a third left side, wherein the first face, the second face, and the third face each are triangular in shape, the first face has a first bottom side, the second face has a second bottom side and the third face has a third bottom side, wherein:
      the first right side of the first face is attached to the second left side of the second face,
      the second right side of the second face is attached to the third left side of the third face, and the third right side of the third face is attached to the first left side of the first face; and
   a triangular base comprising a fourth face of the housing, wherein the first, the second, and the third sides of the base are attached to the first bottom side of the first face, the second bottom side of the second face, and the third bottom side of the third face, respectively.

4. The environmental DNA sample collector of claim 3, wherein the sample collector comprises at least three membrane receptacles, wherein the third face of the housing has at least one third opening between the interior and the exterior of the housing, and wherein at least one membrane receptable of the at least three membrane receptacles is in fluid communication with the at least one first opening of the first face, the at least one second opening of the second face, and the at least one third opening of the third face.

5. The environmental DNA sample collector of claim 3, wherein the triangular base has at least one base opening between the interior and the exterior of the housing, and wherein the at least one base opening of the base is in fluidic communication with at least one membrane receptable of the at least three membrane receptacles.

6. The environmental DNA sample collector of claim 1, wherein
   the membrane receptacle comprises a pair of slots, each slot of the pair of slots having an upper end, a lower end and a groove extending from the upper end of the slot to the lower end, the lower end having a lower end opening, wherein the pair of slots are approximately parallel;
   the membrane holder comprises a planar panel having a pair of approximately parallel sides, wherein each parallel side of the pair of approximately parallel sides of the panel is adapted to fit through a lower end opening of a corresponding slot and to fit in the groove of the corresponding slot.

7. The environmental DNA sample collector of claim 6, wherein the at least one first opening between the interior and the exterior of the housing comprises one or more support bars.

8. The environmental DNA sample collector of claim 6, wherein the planar panel of the membrane holder comprises a plurality of openings.

9. The environmental DNA sample collector of claim 6, wherein the planar panel of the membrane holder comprises one or more support bars.

10. The environmental collector of claim 1, wherein the housing comprises a plurality of membranes, a plurality of membrane receptacles, and a plurality of membrane holders.

11. The environmental DNA sample collector of claim 1, further comprising a threaded connection or a interference fit wherein the membrane holder is secured to the membrane receptacle by the threaded connection or by the interference fit.

12. The environmental DNA sample collector of claim 1, wherein the membrane holder is annular and the membrane receptacle comprises grooves for receiving corresponding spiral threads on the membrane holder, thereby enabling the membrane holder to be retained on the sample collector by a threaded connection.

13. The environmental DNA sample collector of claim 1, wherein the membrane receptacle is integrally formed with housing.

14. The environmental DNA sample collector of claim 1, wherein the first face has a first plurality of openings and the second face has a second plurality of openings.

15. An environmental DNA sample collector comprising:
   a rigid housing;
   a membrane receptable;
   a membrane; and
   a reversibly secured membrane holder, wherein:
      the rigid housing is spherical in shape and comprises an upper half, a lower half, an interior, and an exterior, the interior including an interior surface and the upper half reversibly secured to the lower half in order to enable access to the interior, the rigid housing comprising a plurality of openings disposed between the interior and the exterior;

the membrane receptacle is disposed in the rigid housing in fluid communication with the plurality of openings, the membrane receptacle comprising a space adapted to retain the membrane and further comprising a pair of approximately parallel slots positioned on the interior surface, each slot of the pair of slots having a slot upper end, a slot lower end and a groove extending from the slot upper end to the slot lower end and having an opening at the slot upper end;

the membrane is disposed in the membrane receptable and is configured to capture environmental DNA from a fluid environment when the environmental DNA sample collector is positioned within the fluid environment such that the membrane contacts the fluid environment; and the membrane holder comprises a flexible planar panel having a pair of approximately parallel sides, each parallel side of the flexible planar panel adapted to fit through the opening of a corresponding slot and in the groove of the corresponding slot.

16. The environmental DNA sample collector of claim 1, wherein the housing comprises a plurality of membranes, a plurality of membrane receptacles, and a plurality of membrane holders.

17. The environmental DNA sample collector of claim 1, wherein the membrane receptacle is integrally formed with housing.

* * * * *